(12) United States Patent
Song et al.

(10) Patent No.: US 9,063,258 B2
(45) Date of Patent: Jun. 23, 2015

(54) BACKLIGHT MODULE (71) Applicant: Wistron Corporation, New Taipei (TW)

(72) Inventors: Meng-Li Song, New Taipei (TW); Szu-Pen Wu, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/262,421

(22) Filed: Apr. 25, 2014

(65) Prior Publication Data

US 2015/0131308 A1 May 14, 2015

(30) Foreign Application Priority Data

Nov. 12, 2013 (CN) .......................... 2013 1 0560565

(51) Int. Cl.
*F21V 7/04* (2006.01)
*F21V 8/00* (2006.01)
(52) U.S. Cl.
CPC ............ *G02B 6/0031* (2013.01); *G02B 6/0055* (2013.01)
(58) Field of Classification Search
CPC .. G02B 6/0013; G02B 6/0015; G02B 6/0016; G02B 6/0018; G02B 6/0031
USPC ..................... 362/612, 621; 349/63
See application file for complete search history.

(56) References Cited

U.S. PATENT DOCUMENTS

| 7,021,813 | B2 * | 4/2006 | Lee et al. ...................... 362/609 |
| 7,357,556 | B1 | 4/2008 | Liao et al. |
| 2014/0029294 | A1 | 1/2014 | Huang |

FOREIGN PATENT DOCUMENTS

| TW | I318704 | 12/2009 |
| TW | M410897 | 9/2011 |

* cited by examiner

*Primary Examiner* — Jason Moon Han
(74) *Attorney, Agent, or Firm* — The Mueller Law Office, P.C.

(57) ABSTRACT

A backlight module includes a light guide plate and a supporting assembly. The light guide plate has a light input surface, a light output surface and a back surface. The supporting assembly includes a supporting frame and a light source. The supporting frame includes a first component and a second component. The first component includes a plurality of first reflective teeth. The second component includes a plurality of second reflective teeth. The light source includes an emitting surface. For light emitted from the emitting surface, a first portion travels toward the light input surface directly, a second portion is reflected toward the light input surface by the first reflective teeth, and a third portion is reflected toward the light input surface by the second reflective teeth.

14 Claims, 8 Drawing Sheets

BACKLIGHT MODULE

CROSS-REFERENCE TO RELATED APPLICATION

This application claims priority of Chinese Patent Application No. 201310560565.0, filed on Nov. 12, 2013, the disclosure of which is incorporated herein by reference.

BACKGROUND OF THE INVENTION

1. Field of the Invention

This invention relates to a backlight module, more particularly to an edge-lit backlight module for liquid crystal display device.

2. Description of the Related Art

A liquid crystal display (LCD) device mainly includes a liquid crystal panel, and a backlight module for providing light to the liquid crystal panel. According to different needs, backlight modules are divided into direct back-lit backlight modules and edge back-lit backlight modules.

A conventional edge-lit backlight module includes a light emitting unit, a light guide plate, a back plate and a plastic frame. The light emitting unit has a flexible circuit board and a plurality of light emitting diodes that are disposed on the flexible circuit board. A portion of light emitted from the light emitting diodes is incident upon a light input surface of the light guide plate, and the remaining portion of the light emitted from the light emitting diodes travels to the flexible circuit board, the back plate and the plastic frame. Since the flexible circuit board, the back plate and the plastic frame have low light reflective efficiencies, the remaining portion of the light cannot be reflected thereby efficiently to the light guide plate, resulting in poor usage of light and a relatively low illuminating efficiency of the conventional edge-lit backlight module. To solve the abovementioned problem, luminous efficacy of the light emitting diodes has to be improved. However, this will lead to greater cost.

SUMMARY OF THE INVENTION

Therefore, the object of the present invention is to provide a backlight module that can effectively reduce the loss of light emitted from a light source in order to increase the efficiency of usage of light and the amount of light incident upon a light guide plate.

According to this invention, a backlight module includes a light guide plate and a supporting assembly. The light guide plate has a light input surface, a light output surface and a back surface. The light output surface is connected to an edge of the light input surface. The back surface is connected to another edge of the light input surface and is opposite to the light output surface. The supporting assembly includes a supporting frame and a light source. The supporting frame includes a first component and a second component cooperatively defining a receiving space therebetween. A side of the light guide plate which is formed with the light input surface is inserted into the receiving space such that the light input surface is interposed between the first component and the second component. The first component includes a plurality of first reflective teeth that face the receiving space. The second component includes a plurality of second reflective teeth that face the receiving space. The light source is disposed in the receiving space and has an emitting surface. The emitting surface faces the light input surface and is separated from the light input surface. A first portion of light emitted from the emitting surface of the light source travels directly toward the light input surface. A second portion of the light emitted from the emitting surface of the light source is reflected to travel toward the light input surface by the first reflective teeth. A third portion of the light emitted from the emitting surface of the light source is reflected to travel toward the light input surface by the second reflective teeth.

BRIEF DESCRIPTION OF THE DRAWINGS

Other features and advantages of the present invention will become apparent in the following detailed description of the embodiments of this invention, with reference to the accompanying drawings, in which.

DETAILED DESCRIPTION OF THE EMBODIMENTS

Before the present invention is described in greater detail, it should be noted that like elements are denoted by the same reference numerals throughout the disclosure.

Figure 1:
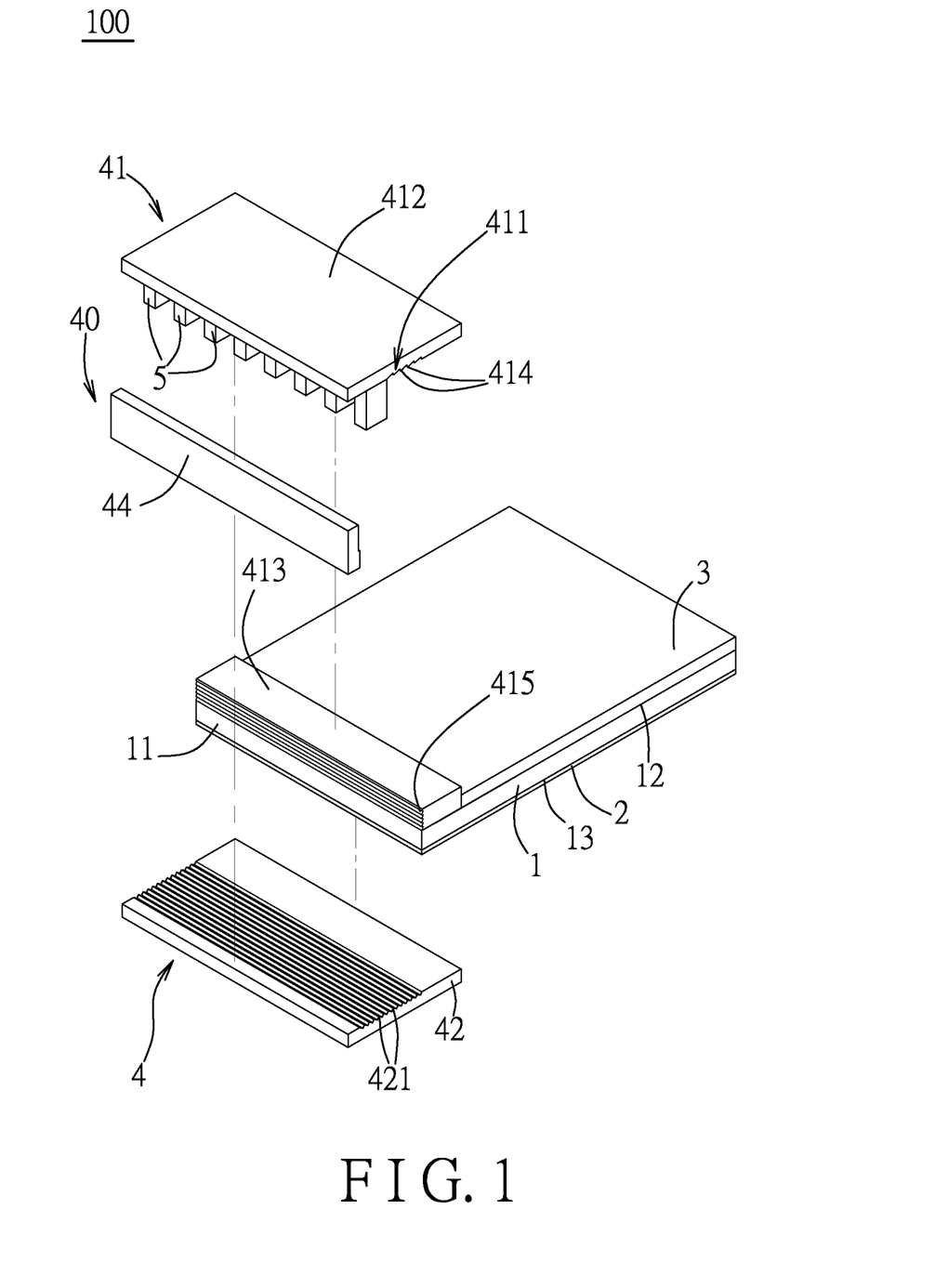
FIG. 1 is a partly exploded perspective view of the first embodiment of a backlight module according to this invention.

FIG. 1 shows a first embodiment of a backlight module 100 according to the present invention. The backlight module 100 is applied in a liquid crystal display (LCD) monitor (not shown). The backlight module 100 is used for providing light to a liquid crystal panel (not shown) of the LCD monitor. In this embodiment, the backlight module 100 is configured as an edge-lit backlight module.

Figure 2:
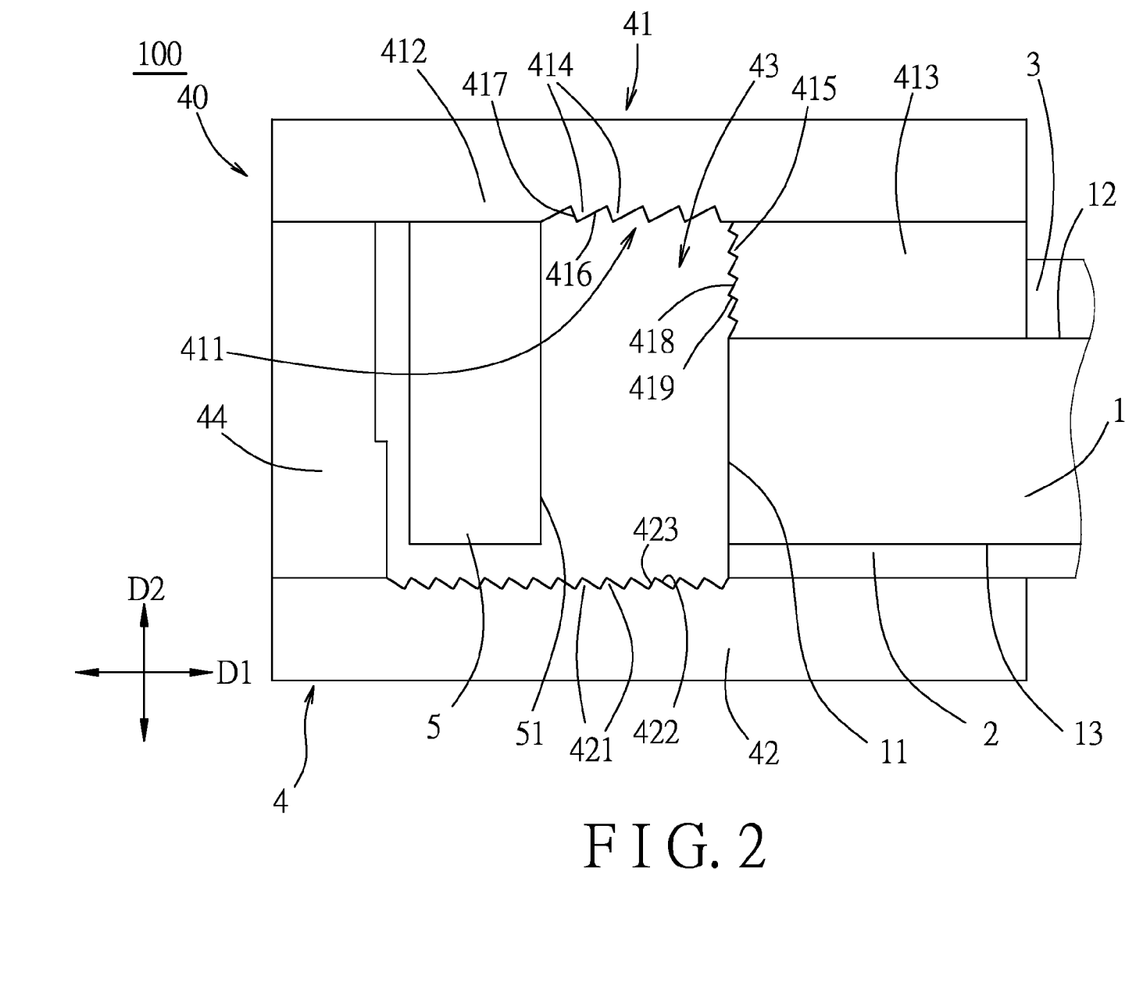
FIG. 2 is a fragmentary side view of the first embodiment.
Figure 3:
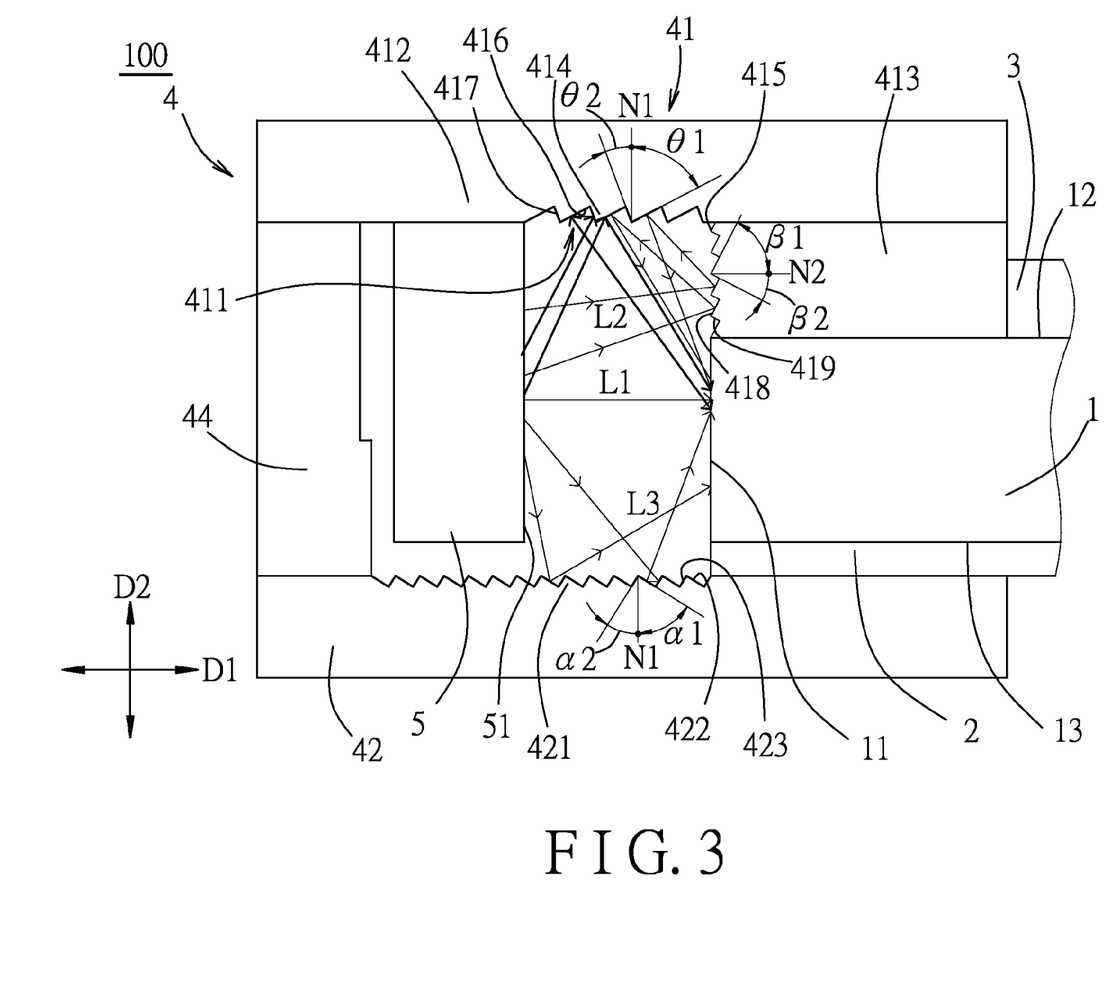
FIG. 3 is a fragmentary side view of the first embodiment showing propagation paths of light emitted from an emitting surface of a light source.

Referring to FIGS. 1, 2 and 3, in this embodiment, the backlight module 100 includes a light guide plate 1, a reflective sheet 2, an optical film unit 3 and a supporting assembly 40. The light guide plate 1 has a light input surface 11, a light output surface 12 connected to an edge of the light input surface 11 and facing forwardly, and a back surface 13 connected to another edge of the light input surface 11 and opposite to the light output surface 12. The reflective sheet 2 is stacked on the back surface 13 of the light guide plate 1. The optical film unit 3 is stacked on the light output surface 12 of the light guide plate 1.

The supporting assembly 40 includes a supporting frame 4 and a plurality of light sources 5. The supporting frame 4 includes a first component 41 and a second component 42 spaced apart from the first component 41. The first component 41 and the second component 42 cooperatively define a receiving space 43 therebetween. A portion of the first component 41 is disposed on a portion of the light output surface 12 of the light guide plate 1. A portion of the second component 42 is stacked on a portion of the reflective sheet 2. A side of the light guide plate 1 which is formed with the light input surface 11 and a corresponding side of the reflective sheet 2 are inserted into the receiving space 43 such that the light input surface 11 of the light guide plate 1 is interposed between the first component 41 and the second component 42. The first component 41 includes a plurality of first reflective teeth 411 facing the receiving space 43. An end one of the first reflective teeth 411 is adjacent to the edge between the light input surface 11 and the light output surface 12. The second component 42 includes a plurality of second reflective teeth 421 facing the receiving space 43. An end one of the second reflective teeth 421 is adjacent to the reflective sheet 2 and the edge between the light input surface 11 and the back surface 13.

The light sources 5 are spaced apart from each other and are disposed in the receiving space 43. Each of the light sources 5 is, for example but not limited to, a light emitting diode, and has an emitting surface 51 facing the light input surface 11 of the light guide plate 1 and separated from the light input surface 11. For each of the light sources 5, a first portion (L1) of light emitted from the emitting surface 51 travels directly toward and is incident upon the light input surface 11 so as to enter the light guide plate 1, a second portion (L2) of the light emitted from the emitting surface 51 travels to the light input surface 11 to enter the light guide plate 1 after being reflected by the first reflective teeth 411, and a third portion (L3) of the light emitted from the emitting surface 51 travels to the light input surface 11 to enter the light guide plate 1 after being reflected by the second reflective teeth 421. In this embodiment, a majority of the light emitted from the emitting surface 51 of each of the light sources 5 travels directly toward the light input surface 11 and constitutes the first portion (L1). a minor portion of the light emitted from the emitting surface 51 of each of the light sources 5 travels directly toward the first component 41 and constitutes the second portion (L2). Another minor portion of the light emitted from the emitting surface 51 of each of the light sources 5 travels directly toward the second component 42 and constitutes the third portion (L3). The light entering the light guide plate 1 is eventually reflected and refracted by grid points of the light guide plate 1, and reflected by the reflective sheet 2 to project out of the light guide plate 1 toward the optical film unit 3 through the light output surface 12 of the light guide plate 1.

By virtue of the first reflective teeth 411 to reflect the second portion (L2) of the light into the light input surface 11 of the light guide plate 1, and the second reflective teeth 421 to reflect the third portion (L3) of the light into the light input surface 11 of the light guide plate 1, loss of the light generated from each of the light sources 5 can effectively be reduced so as to enhance efficiency of usage of light. As a result, brightness of the light entering the light guide plate 1 can be increased.

This embodiment will be depicted in detail in the following description.

Referring to FIGS. 1, 2 and 3, in this embodiment, the first component 41 includes a flexible circuit board 412 connected electrically to the light sources 5, and a reflective plate 413 clamped between the flexible circuit board 412 and the portion of the light output surface 12 of the light guide plate 1 on which the first component 41 is disposed. The second component 42 is a back plate separated from the light sources 5. The supporting frame 4 further includes a plastic frame component 44 clamped between the second component 42 and the flexible circuit board 412. The plastic frame component 44, the first component 41 and the second component 42 cooperatively define the receiving space 43 to form a light-sheltering structure to the light sources 5.

The first reflective teeth 411 are divided into a plurality of first tooth members 414 formed on the flexible circuit board 412, and a plurality of second tooth members 415 formed on the reflective plate 413. The first tooth members 414 are arranged in a first direction (D1) substantially perpendicular to the light input surface 11 of the light guide plate 1. Each of the first tooth members 414 has a first reflective surface 416 facing the light input surface 11 and a second reflective surface 417 connected to the first reflective surface 416. The first reflective surface 416 and the second reflective surface 417 are inclined surfaces. Alternatively, at least the first reflective surface 416 is required to be an inclined surface. Those beams of the second portion (L2) of the light that are emitted directly to the first reflective surfaces 416 of the first tooth members 414 will be reflected toward the light input surface 11 by the first reflective surfaces 416. Those beams of the second portion (L2) of the light that are emitted directly to the second reflective surfaces 417 of the first tooth members 414 will be reflected toward adjacent first reflective surfaces 416 of the first tooth members 414 by the second reflective surfaces 417, to be again reflected thereby toward the light input surface 11.

More specifically, a first normal line (N1) is defined as being perpendicular to the first direction (D1). The first normal line (N1) forms a first included angle ($\theta$1) with the first reflective surface 416 of each first tooth member 414. The first normal line (N1) forms a second included angle ($\theta$2) with the second reflective surface 417 of each first tooth member 414. The first included angle ($\theta$1) is greater than the second included angle ($\theta$2). The first reflective surface 416, which faces the light input surface 11, is larger than the second reflective surface 417. With the relatively larger reflective region, efficiency of reflecting the second portion (L2) of the light toward the light input surface 11 is improved.

Preferably, in this embodiment, the first included angle ($\theta$1) is greater than 30 degrees and smaller than 90 degrees. The second included angle ($\theta$2) is greater than zero degrees and smaller than 30 degrees. The larger the first included angle ($\theta$1), the better the reflective efficiency.

The second reflective teeth 421 of the second component 42 face the first tooth members 414 and are arranged in the first direction (D1). Each of the second reflective teeth 421 has a third reflective surface 422 facing the light input surface 11 and a fourth reflective surface 423 connected to the third reflective surface 422. The third reflective surface 422 and the fourth reflective surface 423 are inclined surfaces. Alternatively, at least the third reflective surface 422 is required to be an inclined surface. Those beams of the third portion (L3) of the light that are emitted directly to the third reflective surfaces 422 of the second reflective teeth 421 will be reflected toward the light input surface 11 by the third reflective surfaces 422. Those beams of the third portion (L3) of the light that are emitted directly to the fourth reflective surfaces 423 of the second reflective teeth 421 will be reflected toward adjacent third reflective surfaces 422 of the second reflective teeth 421 by the fourth reflective surface 423 to be reflected toward the light input surface 11.

More specifically, the first normal line (N1) forms a third included angle ($\alpha$1) with the third reflective surface 422. The first normal line (N1) forms a fourth included angle ($\alpha$2) with the fourth reflective surface 423. The third included angle ($\alpha$1) is greater than the fourth included angle ($\alpha$2). The third reflective surface 422, which faces the light input surface 11, is larger than the fourth reflective surface 423. With the relatively larger reflective region, efficiency of reflecting the third portion (L3) of the light toward the light input surface 11 is improved.

Preferably, the third included angle (α1) is greater than 30 degrees and is smaller than 90 degrees. The fourth included angle (α2) is greater than zero degrees and smaller than 30 degrees. The larger the third included angle (α1), the better the reflective efficiency.

It should be noted that the reflective plate 413 is not an essential element but an auxiliary element. Since a thickness of each of the light sources 5, which are disposed on the flexible circuit board 412, may be different from that of the light guide plate 1 (e.g., when the light sources 5 and the light guide plate 1 are products commercially available from different companies), the reflective plate 413 can be properly used to adjust a distance between the first component 41 and the second component 42 when the thickness of the light guide plate 1 is smaller than that of each of the light sources 5. In this embodiment, since the thickness of the light guide plate 1 is smaller than that of each of the light sources 5, the reflective plate 413 is provided to be sandwiched between the light output surface 12 of the light guide plate 1 and the flexible circuit board 412 to prevent leakage of the light emitted from the light sources 5 therebetween. The second tooth members 415 are adjacent to an end one of the first tooth members 414, and are arranged in a second direction (D2) that is substantially parallel to the light input surface 11 of the light guide plate 1. Each of the second tooth members 415 has a fifth reflective surface 418 that confronts the first tooth members 414 and a sixth reflective surface 419 that is connected to the fifth reflective surface 418 and that faces the second reflective teeth 421. The fifth reflective surface 418 and the sixth reflective surface 419 are inclined surfaces. Alternatively, at least the fifth reflective surface 418 is required to be an inclined surface.

Those beams of the second portion (L2) of the light that are emitted directly to the fifth reflective surfaces 418 of the second tooth members 415 will be reflected toward the first reflective surfaces 416 of the first tooth members 414 by the fifth reflective surfaces 418 to be subsequently reflected toward the light input surface 11 by the first reflective surfaces 416. Those beams of the second portion (L2) of the light that are emitted directly to the sixth reflective surfaces 419 of the second tooth members 415 will be reflected toward the third reflective surfaces 422 of the second reflective teeth 421 to be subsequently reflected toward the light input surface 11 by the third reflective surfaces 422. Alternatively, those beams of the second portion (L2) of the light that are incident upon the sixth reflective surfaces 418 may be reflected to travel to the adjacent fifth reflective surfaces 418 and then reflected by the fifth reflective surfaces 418 toward the first reflected surfaces 416 for subsequent propagation to the light input surface 11 through the reflection mechanisms described above.

More specifically, a second normal line (N2) is defined as being perpendicular to the second direction (D2). The second normal line (N2) forms a fifth included angle (β1) with the fifth reflective surface 418. The second normal line (N2) forms a sixth included angle (β2) with the sixth reflective surface 419. The fifth included angle (β1) is greater than the sixth included angle (β2). The fifth reflective surface 418 is greater than the sixth reflective surface 419. With the relatively larger reflective region, efficiency of reflecting the second portion (L2) of the light toward the light input surface 11 is improved.

Preferably, in this embodiment, the fifth included angle (β1) is greater than 30 degrees and smaller than 90 degrees. The sixth included angle (β2) is greater than zero degrees and smaller than 30 degrees. The larger the fifth included angle (β1), the better the reflective efficiency.

Figure 4:
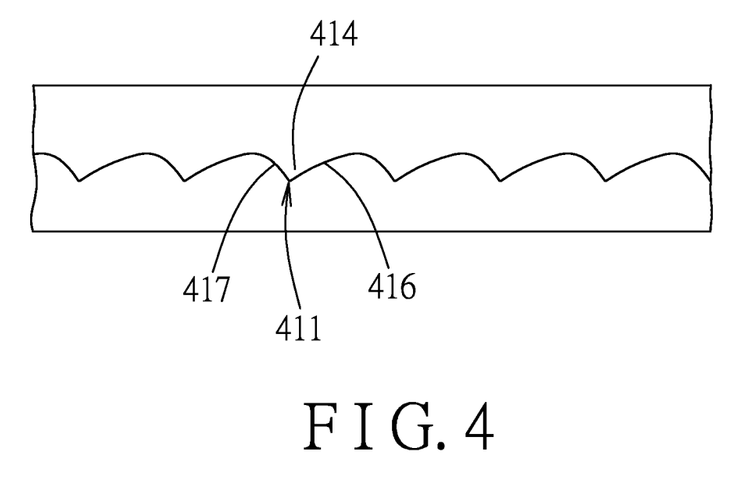
FIG. 4 is a fragmentary enlarged side view of a flexible circuit board according to a variation of the first embodiment, showing that a first reflective surface and a second reflective surface of each of first tooth members are configured as curved surfaces.

It should be noted that, although the first reflective surface 416 and the second reflective surface 417 of each of the first tooth members 414 are inclined flat surfaces in this embodiment, they may be designed as inclined curved surfaces as shown in FIG. 4 to achieve the same light reflecting effect. Similarly, the fifth reflective surface 418 and the sixth reflective surface 419 of each of the second tooth members 415, and the third reflective surface 422 and the fourth reflective surface 423 of each of the second reflective teeth 421 may also be designed to be inclined curved surfaces.

Figure 5:
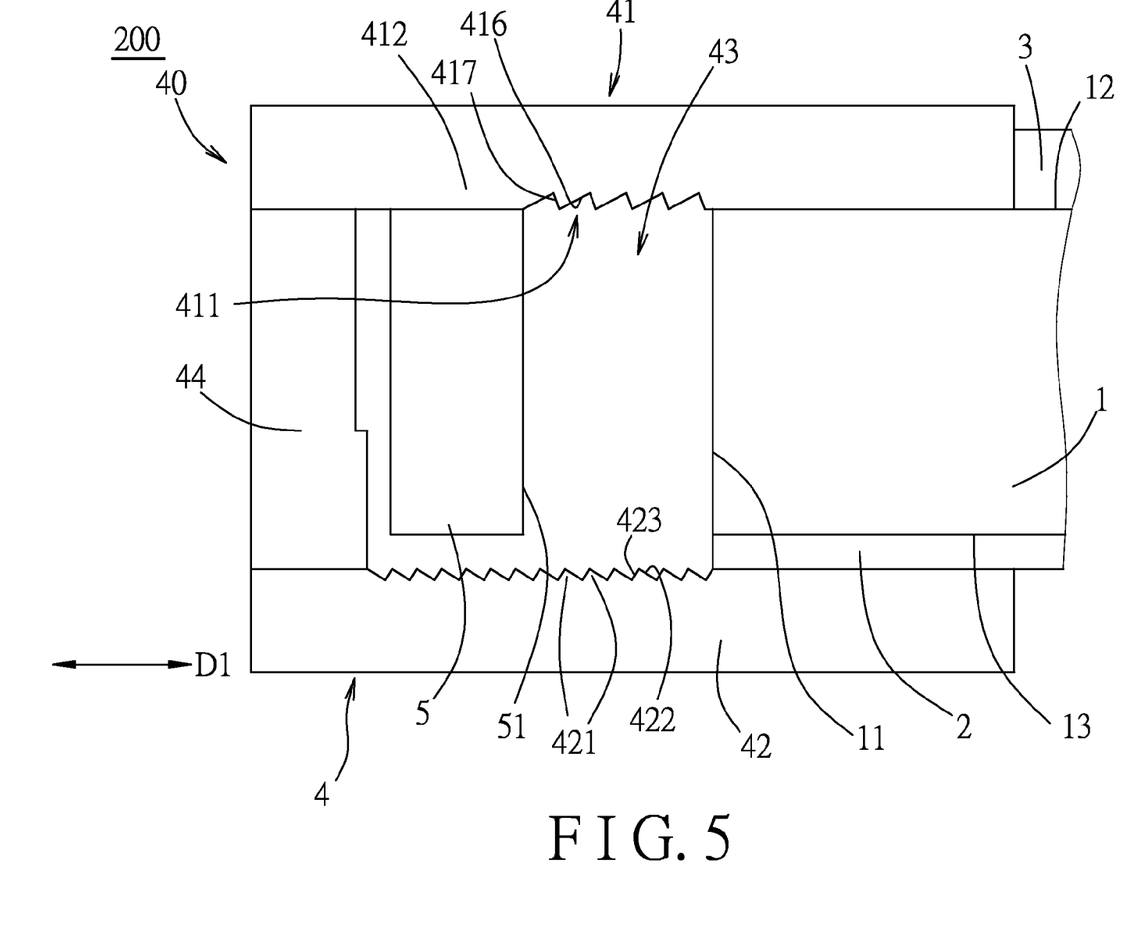
FIG. 5 is a fragmentary side view of the second embodiment of a backlight module according to this invention.
Figure 6:
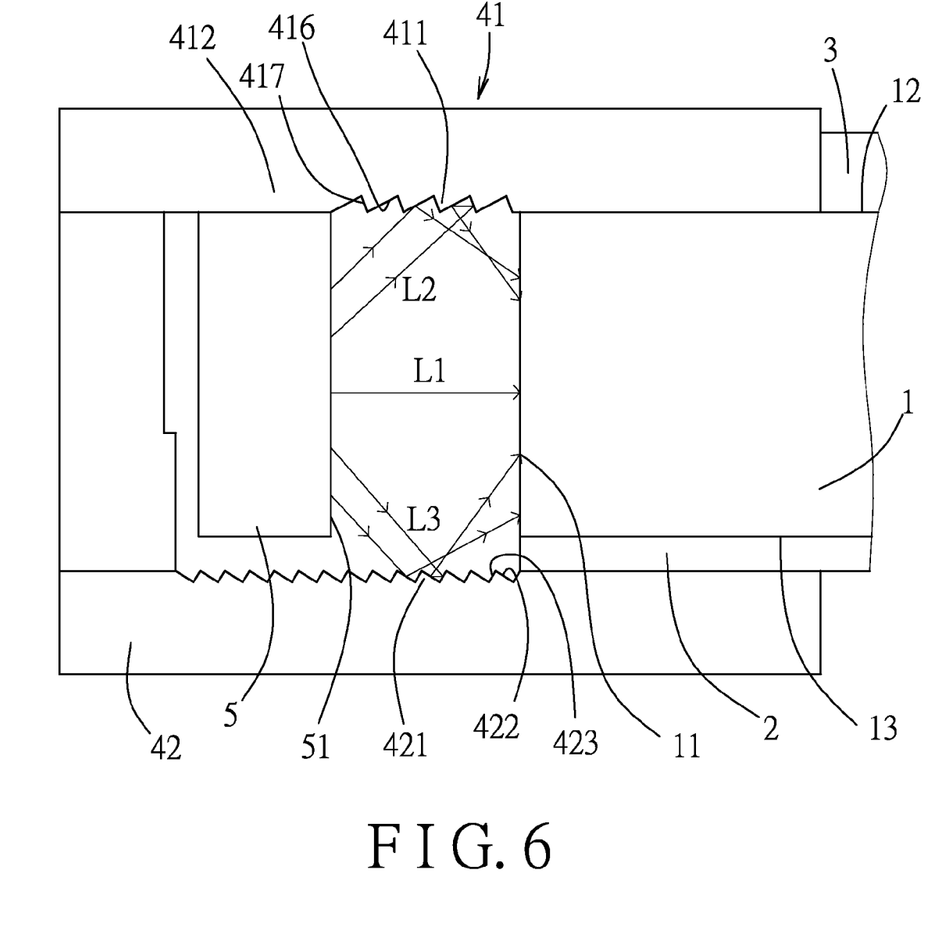
FIG. 6 is a fragmentary side view of the second embodiment showing propagation paths of the light emitted from the emitting surface of the light source.

FIGS. 5 and 6 show a second embodiment of a backlight module 200 according to the present invention. The backlight module 200 has a structure similar to that of the first embodiment, except for the structure of the supporting frame 4.

In this embodiment, the thickness of the light guide plate 1 is greater than that of the light guide plate 1 of the first embodiment, so that a portion of the flexible circuit board 412 of the first component 41 is stacked directly on a portion of the light output surface 12 of the light guide plate 1. The first reflective teeth 411 are formed on a side of the flexible circuit board 412 that faces the receiving space 43. The first reflective teeth 411 are all arranged in the first direction (D1). Each of the first reflective teeth 411 has a first reflective surface 416 that faces the light input surface 11 of the light guide plate 1, and a second reflective surface 417 that is connected to the first reflective surface 416.

Those beams of the second portion (L2) of the light that are emitted directly toward the first reflective surfaces 416 of the first reflective teeth 411 will be reflected toward the light input surface 11 by the first reflective surfaces 416. Those beams of the second portion (L2) of the light that are emitted directly toward the second reflective surfaces 417 of the first reflective teeth 411 will be reflected toward the adjacent first reflective surfaces 416 by the second reflective surfaces 417, and then reflected toward the light input surface 11 by the first reflective surfaces 416.

Figure 7:
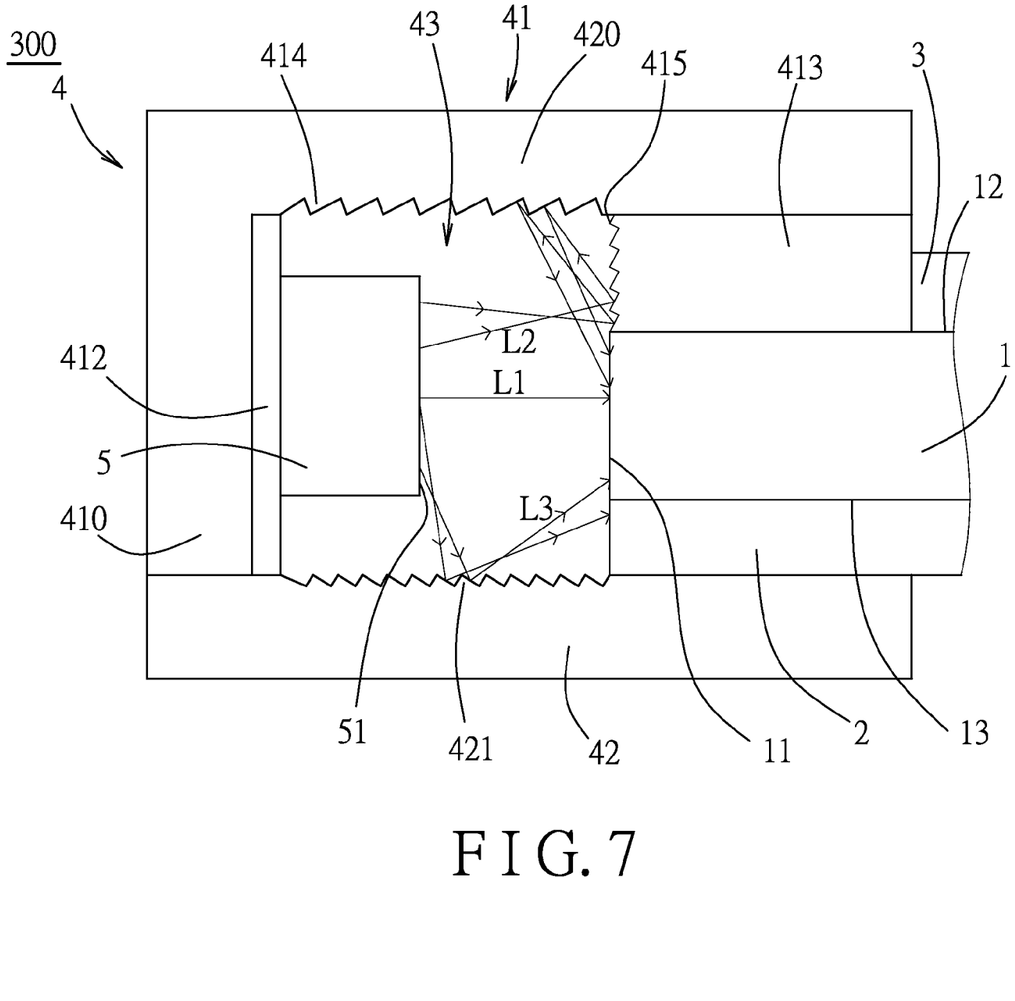
FIG. 7 is a fragmentary side view of the third embodiment of a backlight module according to this invention.

FIG. 7 shows a third embodiment of a backlight module 300 according to the present invention. The backlight module 300 has a structure similar to that of the backlight module 100 of the first embodiment, except for the structure of the supporting frame 4.

In this embodiment, the first component 41 includes an end plate 420 that is separated from the light sources 5 (only one is shown in FIG. 7) and a reflective plate 413 that is clamped between the end plate 420 and a portion of the light output surface 12 of the light guide plate 1. The first tooth members 414 are formed on the end plate 420. The supporting frame 4 further includes a lateral plate 410 formed on an end of the end plate 420 that is opposite to the reflective plate 413. The lateral plate 410 and the end plate 420 are formed as one piece to serve as a plastic frame member. The lateral plate 410 is connected to the second component 42. The lateral plate 410, the first component 41 and the second component 42 cooperatively define the receiving space 43. The flexible circuit board 412 is disposed on an inner side of the lateral plate 410.

Figure 8:
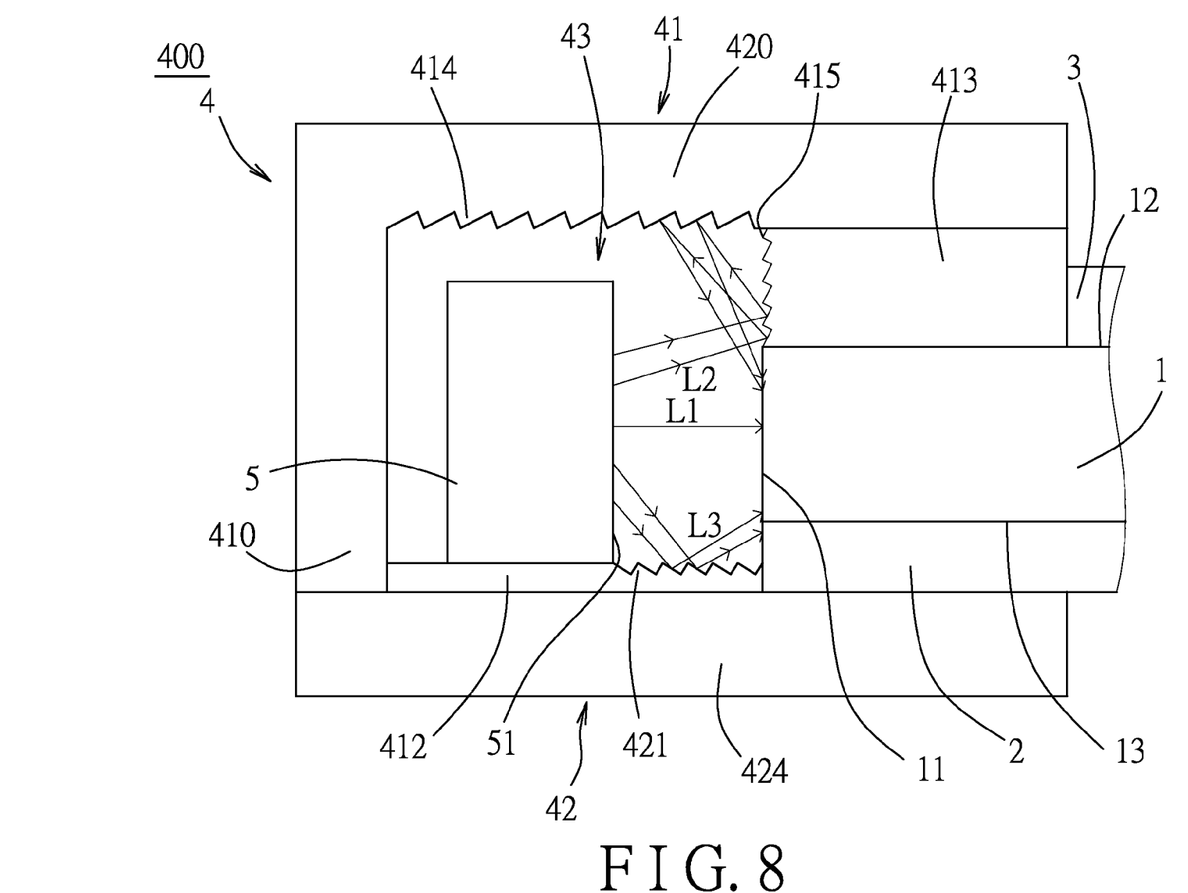
FIG. 8 is a fragmentary side view of the fourth embodiment of a backlight module according to this invention.

FIG. 8 shows a fourth embodiment of a backlight module 400 according to the present invention. The backlight module 400 has a structure similar to that of the backlight module 300 of the third embodiment, except for the structure of the supporting frame 4.

In this embodiment, the second component 42 includes a back plate 424. In addition, the flexible circuit board 412 is part of the second component 42, instead of the first component 41, is disposed on an inner side of the back plate 424, and is connected electrically to the light sources 5 (only one is shown in FIG. 8). The second reflective teeth 421 are formed on the flexible circuit board 412.

It should be noted that the reflective sheet 2 stacked on the back surface 13 of the light guide plate 1 in each of the abovementioned embodiments may be a reflective layer printed on or attached to the back surface 13 of the light guide plate 1.

To sum up, by virtue of the first reflective teeth 411 of the first component 41 to reflect the second portion (L2) of the light to be incident upon the light input surface 11 of the light guide plate 1, and the second reflective teeth 421 of the second component 42 to reflect the third portion (L3) of the light to be incident upon the light input surface 11 of the light guide plate 1, the backlight modules 100, 200, 300, 400 of each of the embodiments of this invention can efficiently reduce the loss of light generated from the light sources 5 and therefore enhance the efficiency of usage of light and brightness of the light entering the light guide plate 1. As a result, the object of the present invention can be accomplished.

While the present invention has been described in connection with what are considered the most practical embodiments, it is understood that this invention is not limited to the disclosed embodiments but is intended to cover various arrangements included within the spirit and scope of the broadest interpretation and equivalent arrangements.

What is claimed is:

1. A backlight module comprising:
   a light guide plate having a light input surface, a light output surface that is connected to an edge of said light input surface, and a back surface that is connected to another edge of said light input surface and that is opposite to said light output surface; and
   a supporting assembly including
   a supporting frame that includes a first component and a second component cooperatively defining a receiving space therebetween, a side of said light guide plate which is formed with said light input surface being inserted into said receiving space such that said light input surface is interposed between said first component and said second component, said first component including a plurality of first reflective teeth that face said receiving space, said second component including a plurality of second reflective teeth that face said receiving space, and
   a light source that is disposed in said receiving space and that has an emitting surface facing said light input surface and separated from said light input surface, a first portion of light emitted from said emitting surface of said light source traveling directly to said light input surface, a second portion of the light emitted from said emitting surface of said light source being reflected by said first reflective teeth to travel toward said light input surface, a third portion of the light emitted from said emitting surface of said light source being reflected by said second reflective teeth to travel toward said light input surface;
   wherein an end one of said first reflective teeth is adjacent to said edge between said light input surface and said light output surface, an end one of said second reflective teeth being adjacent to said edge between said light input surface and said back surface;
   wherein said first reflective teeth are arranged in a first direction that is substantially perpendicular to said light input surface, each of said first reflective teeth having a first reflective surface that faces said light input surface and a second reflective surface that is connected to said first reflective surface; and
   wherein a first normal line is defined as being perpendicular to the first direction, the first normal line forming a first included angle with said first reflective surface, the first normal line forming a second included angle with said second reflective surface, the first included angle being greater than the second included angle, said first reflective surface being larger than said second reflective surface.

2. The backlight module as claimed in claim 1, wherein the first included angle is greater than 30 degrees and smaller than 90 degrees, the second included angle being greater than zero degrees and smaller than 30 degrees.

3. The backlight module as claimed in claim 1, wherein said first component is a flexible circuit board that is connected electrically to said light source and that is stacked on a portion of said light output surface of said light guide plate, said second component being a back plate that is separated from said light source.

4. The backlight module as claimed in claim 1, wherein said second reflective teeth face said first reflective teeth and are arranged in the first direction, each of said second reflective teeth having a third reflective surface that faces said light input surface and a fourth reflective surface that is connected to said third reflective surface.

5. The backlight module as claimed in claim 4, wherein the first normal line forms a third included angle with said third reflective surface, the first normal line forming a fourth included angle with said fourth reflective surface, the third included angle being greater than the fourth included angle, said third reflective surface being larger than said fourth reflective surface.

6. The backlight module as claimed in claim 5, wherein the third included angle is greater than 30 degrees and smaller than 90 degrees, the fourth included angle being greater than zero degrees and smaller than 30 degrees.

7. A backlight module comprising:
   a light guide plate having a light input surface, a light output surface that is connected to an edge of said light input surface, and a back surface that is connected to another edge of said light input surface and that is opposite to said light output surface; and
   a supporting assembly including:
   a supporting frame that includes a first component and a second component cooperatively defining a receiving space therebetween, a side of said light guide plate which is formed with said light input surface being inserted into said receiving space such that said light input surface is interposed between said first component and said second component, said first component including a plurality of first reflective teeth that face said receiving space, said second component including a plurality of second reflective teeth that face said receiving space, and
   a light source that is disposed in said receiving space and that has an emitting surface facing said light input surface and separated from said light input surface, a first portion of light emitted from said emitting surface of said light source traveling directly to said light input surface, a second portion of the light emitted from said emitting surface of said light source being reflected by said first reflective teeth to travel toward said light input surface, a third portion of the light emitted from said emitting surface of said light source being reflected by said second reflective teeth to travel toward said light input surface;
   wherein an end one of said first reflective teeth is adjacent to said edge between said light input surface and said light output surface, an end one of said second reflective teeth being adjacent to said edge between said light input surface and said back surface;

wherein said first reflective teeth are divided into a plurality of first tooth members and a plurality of second tooth members that are adjacent to an end one of said first tooth members, said first tooth members being arranged in a first direction that is substantially perpendicular to said light input surface, each of said first tooth members having a first reflective surface that faces said light input surface and a second reflective surface that is connected to said first reflective surface, said second tooth members being arranged in a second direction that is substantially parallel to said light input surface, each of said second tooth members having a fifth reflective surface that confronts said first tooth members and a sixth reflective surface that is connected to said fifth reflective surface and that faces said second reflective teeth;

wherein a first normal line is defined as being perpendicular to the first direction, the first normal line forming a first included angle with said first reflective surface, the first normal line forming a second included angle with said second reflective surface, the first included angle being greater than the second included angle, said first reflective surface being larger than said second reflective surface; and wherein a second normal line is defined as being perpendicular to the second direction, the second normal line forming a fifth included angle with said fifth reflective surface, the second normal line forming a sixth included angle with said sixth reflective surface, the fifth included angle being greater than the sixth included angle, said fifth reflective surface being greater than said sixth reflective surface.

8. The backlight module as claimed in claim 7, wherein the first included angle is greater than 30 degrees and smaller than 90 degrees, the second included angle being greater than zero degrees and smaller than 30 degrees, the fifth included angle being greater than 30 degrees and smaller than 90 degrees, the sixth included angle being greater than zero degrees and smaller than 30 degrees.

9. The backlight module as claimed in claim 7, wherein said second reflective teeth face said first tooth members and are arranged in the first direction, each of said second reflective teeth having a third reflective surface that faces said light input surface and a fourth reflective surface that is connected to said third reflective surface.

10. The backlight module as claimed in claim 9, wherein the first normal line forms a third included angle with said third reflective surface, the first normal line forming a fourth included angle with said fourth reflective surface, the third included angle being greater than the fourth included angle, said third reflective surface being larger than said fourth reflective surface.

11. The backlight module as claimed in claim 10, wherein the third included angle is greater than 30 degrees and is smaller than 90 degrees, the fourth included angle being greater than zero degrees and smaller than 30 degrees.

12. The backlight module as claimed in claim 10, wherein said first component includes a flexible circuit board that is connected electrically to said light source, and a reflective plate that is clamped between said flexible circuit board and a portion of said light output surface of said light guide plate, said first tooth members being formed on said flexible circuit board, said second tooth members being formed on said reflective plate, said second component being a back plate that is separated from said light source.

13. The backlight module as claimed in claim 10, wherein said first component includes an end plate that is separated from said light source and a reflective plate that is clamped between said end plate and a portion of said light output surface of said light guide plate, said first tooth members being formed on said end plate, said second tooth members being formed on said reflective plate, said second component being a back plate that is separated from said light source.

14. The backlight module as claimed in claim 10, wherein said first component includes an end plate that is separated from said light source and a reflective plate that is clamped between said end plate and a portion of said light output surface of said light guide plate, said first tooth members being formed on said end plate, said second tooth members being formed on said reflective plate, said second component including a back plate and a flexible circuit board that is disposed on said back plate and that is connected electrically to said light source, said second reflective teeth being formed on said flexible circuit board.

* * * * *